(12) United States Patent
Fogal, Sr.

(10) Patent No.: US 7,169,830 B2
(45) Date of Patent: Jan. 30, 2007

(54) TIRE SEALANT COMPOSITION

(76) Inventor: Robert D. Fogal, Sr., 15 Kenwood Rd., Chambersburg, PA (US) 17201

( * ) Notice: Subject to any disclaimer, the term of this patent is extended or adjusted under 35 U.S.C. 154(b) by 288 days.

(21) Appl. No.: 10/822,210

(22) Filed: Apr. 8, 2004

(65) Prior Publication Data

US 2005/0228083 A1    Oct. 13, 2005

(51) Int. Cl.
    *B29C 73/00*    (2006.01)
(52) U.S. Cl. .................... 523/166; 524/27; 524/56
(58) Field of Classification Search ................ 523/166; 524/27, 56
    See application file for complete search history.

(56) References Cited

U.S. PATENT DOCUMENTS

| | | | |
|---|---|---|---|
| 598,613 A * | 2/1898 | Lucas | ............ 152/503 |
| 4,139,395 A | 2/1979 | Dunlap | |
| 4,337,322 A | 6/1982 | Jaspon | |
| 4,588,758 A | 5/1986 | Jaspon | |
| 4,776,888 A | 10/1988 | Morrow | |
| 5,059,636 A | 10/1991 | Grenga | |
| 5,364,463 A | 11/1994 | Hull | |
| 5,639,319 A | 6/1997 | Daly | |
| 6,344,499 B1 | 2/2002 | Kawamura et al. | |

FOREIGN PATENT DOCUMENTS

JP    49-39638    4/1974

* cited by examiner

*Primary Examiner*—Edward J. Cain
(74) *Attorney, Agent, or Firm*—Hahn Loeser & Parks, LLP; Robert J. Clark

(57) ABSTRACT

A tire sealant composition for use in pneumatic tires is provided. The tire sealant composition primarily serves to seal the tire around the wheel rim and particularly in the tread area of the tire against punctures. The composition includes a naturally derived viscous carrier fluid and at least one fibrous material, polymeric material or combination of both, wherein the composition remains fluid in use. The naturally derived viscous carrier fluid is preferably desugared molasses (less than 30% by weight sucrose) and is able to sustain a temperature of −30° F. (−34.4° C. and below) without freezing. The tire sealant composition is fire-retardant, non-toxic, non-corrosive and non-abrasive and is environmentally friendly.

14 Claims, No Drawings

TIRE SEALANT COMPOSITION

FIELD OF THE INVENTION

The present invention relates to tire sealant compositions for use in pneumatic tires, for purposes of providing an anti-puncture sealant in the tread area of the tire to prevent flat tires. More particularly, the tire sealant compositions of the present invention provide an effective, environmentally friendly, and safe alternative to existing tire sealant compositions.

BACKGROUND OF THE INVENTION

Tire sealant compounds have long been used in pneumatic tires. One type of tire sealant is injected into a flat tire and inflates/seals the tire. These short-term types tire sealants are intended as an emergency measure, to be injected into the tire through the valve stem after a puncture occurs, and do not remain active for extended periods of time after placement in the tire. Known sealant compositions of this type include water-based latexes, which are effective for only a short time, because they dry by evaporation and coagulation, leaving a rubbery mass. Another type of short-term tire sealant employs a solution of sodium silicate or cellulosic material which dry to form a sealing plug. Solutions of dextrin and similar organic gums have also been used. All of these compositions have the shortcoming that they dry after a relatively short period of time, and therefore cannot be used for permanent or long-term protection from punctures, but rather are normally applied after a puncture occurs.

Another type of tire sealant is a preventative sealant that is used on the innerliner of the tire and reacts to punctures by sealing them on an as-needed basis. One of the most common long-term tire sealants includes a glycol ether carrier liquid (typically ethylene glycol or polypropylene glycol) with suspended fibers of glass and/or cellulose. An example of this type of sealant is disclosed in U.S. Pat. No. 4,337,322. This patent teaches the making of a sealant composition using the following ingredients: asbestos fibers, ethylene glycol monomer, polyethylene glycol, polyisoprene, process oil, detergent, sodium bicarbonate and water. This type of sealant has several drawbacks. First, ethylene glycol ethers are potentially poisonous and toxic, the combination of which makes the material very dangerous for consumer applications. A second disadvantage is that the freezing points of glycol ethers have a wide range from −13° C. to −97° C. and the viscosity of glycol ethers varies greatly between −5° C. and 25° C. Because the temperature of a vehicle tire in use may vary from below −29° C. to above 50° C., the practical effective temperature range of sealant mixtures based on glycol ethers is limited.

At least one tire sealant claims an environmentally safe product. This tire sealant is disclosed in U.S. Pat. No. 5,059,636, which teaches the making of a sealant composition including: finely ground rubber, calcium chloride, wheat flour, water, sodium nitrite, vegetable oil and a defoaming agent. The use of vegetable oil in this composition is to emulsify the mixture so that the ingredients of the product do not separate upon mixing. The calcium chloride serves to lower the freezing point of the sealant so that it remains operative at temperatures as low as −30° F. However, a problem with this sealant is that the calcium chloride reacts with the metal wheel resulting in corrosion.

Another problem with tire sealants is that many contain materials that may become combustible during a tire retreading process. Prior to retreading a tire, any tire sealant on the innerliner must be removed and is typically washed out with water. Some of the sealant materials often remain on the innerliner and dry. During the retreading process, a tire tread is cured to the tire in an autoclave chamber under elevated pressure and temperature conditions. The temperatures typically range from 212–260 degrees Fahrenheit depending on whether the tread has been pre-cured. Any remaining sealant materials dried on the tire innerliner are subjected to the elevated temperature and pressure. If these sealant materials are combustible, such as cellulose fibers, it is possible for a chamber fire to occur.

Accordingly, there is a need for an effective tire sealant composition comprising an environmentally safe carrier fluid material where the material will flow at very low temperatures (−30° F., −34.4° C.) without freezing, and wherein the material will not react with a wheel and cause corrosion and will not support combustion in the tire retreading process after it is dry inside the tire.

SUMMARY OF THE INVENTION

A sealant composition overcoming one or more of the problems identified in the prior art is provided by a tire sealant composition for pneumatic tires comprising, a naturally derived viscous carrier fluid, and at least one fibrous and/or polymeric material, wherein the composition remains fluid in use and is non-corrosive.

These and other advantages are also provided by a method of sealing a tire comprising the steps of: providing a tire; at least partially filling the tire with a composition which is a fluid comprising a naturally derived viscous carrier fluid and at least one fibrous and/or polymeric material, wherein the composition remains fluid in use and is non-corrosive; puncturing the tire during use; allowing the composition to flow to said puncture, wherein the composition fills and seals the puncture.

DETAILED DESCRIPTION OF THE PREFERRED EMBODIMENTS

An improved tire sealant composition according to the present invention includes a naturally derived viscous carrier fluid and at least one fibrous material and/or polymeric material, wherein the composition remains fluid in use and is non-corrosive. Various additives may be employed to modify the viscosity, reduce corrosion potential, prevent fungal and bacterial growth, modify the surface tension, and the like. Other additives, such as coloring agents for more attractive and marketable appearance and fragrances to present a more pleasing odor of the product during installation, are optional and have no practical effect on the functioning of the composition as a sealant. It is contemplated that many known tire sealant compositions can be converted to the present invention by simply replacing the existing carrier material with the naturally derived viscous carrier fluid disclosed herein.

In the preferred embodiment, the naturally derived viscous carrier fluid is molasses. Molasses compositions are produced from sorghum, cane, sugar beet, corn, soybean, or lumber (lignin) products. The process which produces sugar beet or cane molasses is described in Kirk-Othmer, Third Edition, Volume 21, pages 904 to 920 (1983) and by Buzzanell, P. et al, The Sugarbeet Grower, pages 11 to 14 (1993). Molasses contains all its natural sugars and is normally a beet, sorghum, or cane molasses. Desugared sugar beet molasses (preferably containing hydrogenated protein and amino acids) has had most of the sucrose sugar removed (less than about 30% by weight sucrose). It is contemplated that the molasses may be supplemented by limited amounts of water without detrimentally affecting the performance of the tire sealant composition.

Unlike desugared cane molasses, which has only salt water as its final by-product, desugared sugar beet molasses has betaine, carbohydrates, cell wall amino acids, and contains 35–89% by weight solids from the beet fiber. The desugared molasses contains about 18% proteins, 15% sugars, 18% carbohydrates, 16% potassium salts, all by weight and the remainder is water. The processed desugared material weighs 8.0 to 11.6 lbs. per gallon (0.95 to 1.4 kg/liter) vs. 11.7 lbs. per gallon (1.40 kg/liter) for regular molasses. The desugared molasses flows at very low temperatures (−30° F., −34.4° C.) and can be pumped with a hand, centrifugal, piston, or gear pump at ambient temperatures. The desugared molasses typically has a viscosity of over 1000 cP and typically in the range of 5,000–10,000 cP. Corn syrup and sugared molasses have significantly higher viscosities.

Cane molasses, beet molasses, or other molasses are all food grade products. The desugared molasses is not for human consumption but is still safe for use as animal feeds and soil building agents. However, desugared molasses is non-toxic, non-abrasive, non-corrosive, biodegradable and environmentally friendly. Desugared molasses has been successfully used as a ballast material for agricultural tires as shown in U.S. Pat. No. 5,639,319, hereby incorporated by reference.

It has been found that the molasses remains in a fluid state and does not freeze and become solid even at temperatures as low as −30° F. (and below). Furthermore the molasses, particularly the desugared molasses, protects the metal of the rim of the tire from rusting. The molasses will also not affect tire gauges used to check air in tires.

It is also contemplated that other natural products may be substituted for molasses, yet retain the performance characteristics as a viscous carrier fluid for the tire sealant of the present invention. One such natural product is corn syrup which has similar properties as that of molasses and it is contemplated that corn syrup may be substituted in whole or in part for the molasses.

Sealants pursuant to one embodiment of the present invention employ fibrous materials of a variety of different lengths and/or polymeric materials, suspended in the carrier liquid. The fibrous materials act to effectively form an overlayment that is able to completely stop all liquid flow. If liquid cannot escape, air is effectively retained indefinitely. Suitable fibrous materials include cellulose, wool, flax, nylon, rayon, wollastonite, rock wool, glass wool, cotton, polyester, polyethylene, aramid, acrylic, glass, carbon, Kevlar, and polypropylene. The polymeric material is preferably ground rubber.

As mentioned in the background section, several known fibrous materials may dry on the innerliner of the tire and result in a chamber fire during the retreading process. In one embodiment of the present invention, the fibers are limited to non-combustible fibers and/or polymeric materials, resulting in a composition that is fire retardant at temperatures exceeding 500 degrees F.

In another embodiment of the present invention, the tire sealant composition comprises a naturally derived viscous carrier fluid and a polymeric material, preferably ground rubber, and may not include fibers.

In operation, the tire sealant may be inserted into a tire wheel assembly through the valve stem or directly applied to innerliner of the tire during the seating operation of tire on the wheel. This process may include a sprayer used to ensure that the entire innerliner is covered by the viscous tire sealant including the crown area. It is also contemplated that the sealant be enclosed in a self-contained batch such as a bag that is thrown into the tire. As the tire rotates, the bag tumbles until the bag ruptures and releases the sealant. Any other known methods of inserting tire sealant into a tire assembly is also contemplated herein. The tire sealant partially fills the tire and is moved by rotational centrifugal force during operation of the tire to cover the innerliner of the tire. If the tire is punctured during use, the tire sealant composition flows to the puncture, wherein the composition fills and seals the puncture.

It is also contemplated that the present invention could be used as an instant tire puncture sealer by combining the composition in one or more known pressurized canister delivery systems.

It is to be understood, however, that even though numerous characteristics and advantages of the present invention have been set forth in the foregoing description, together with details of the structure and function of the invention, the disclosure is illustrative only, and changes may be made within the principles of the invention to the full extent indicated by the broad general meaning of the terms in which the appended claims are expressed and reasonable equivalents thereof.

What is claimed is:

1. A tire sealant composition for pneumatic tires comprising:
   a carrier fluid comprising a fluid derived from at least one of sorghum, cane, sugar beet, corn, soybean, arid lumber; and
   at least one polymeric material comprising at least ground rubber,
   wherein the composition remains fluid in use and is non-corrosive.

2. The tire sealant composition of claim 1, wherein the viscosity of the carrier fluid is greater than 1000 cP.

3. The tire sealant composition of claim 1, wherein said carrier fluid comprises at least one of liquid molasses and corn syrup.

4. The tire sealant composition of claim 3, wherein the carrier fluid is desugared.

5. The tire sealant composition of claim 1 further comprising at least one fibrous material selected from the group consisting of cellulose, wool, flax, nylon, rayon, wollastonite, rock-wool, cotton, glass, polyester, Kevlar, and polypropylene.

6. The tire sealant composition of claim 5, wherein said at least one fibrous material is fire-retardant.

7. The tire sealant composition of claim 1, further comprising water.

8. A method of for sealing a tire comprising the steps of:
   providing a tire;
   at least partially filling the tire with a composition which is a fluid comprising a carrier fluid and at least one polymeric material comprising at least ground rubber, wherein the carrier fluid comprises a fluid derived from at least one of sorghum, cane, sugar beet, corn, soybean, and lumber, and wherein the composition remains fluid in use and is non-corrosive;
   puncturing the tire during use;
   allowing the composition to flow to the puncture, wherein the composition fills and seals the puncture.

9. The method of claim 8 wherein the step of at least partially filling the tire with the composition is accomplished by spraying the composition on the innerliner of the tire.

10. The method of claim 8 wherein the step of at least partially filling the tire with the composition is accomplished by providing the composition in a bag that is placed on the air chamber of the tire and bursts during rotation of the tire in use and releases the composition onto the innerliner of the tire.

11. A method of for sealing a punctured tire comprising the steps of:

provding a punctured tire;

providing a pressurized container having at least in part a composition which is a fluid comprising a carrier fluid and at least one at least one polymeric material comprising at least ground rubber, wherein the carrier fluid comprises a fluid derived from at least one of sorghum, cane, sugar beet, corn, soybean, and lumber, and wherein the composition remains fluid in use and is non-corrosive;

allowing the composition to flow to the puncture, wherein the composition Fills and seals the puncture.

12. A method of for sealing a tire comprising the steps of:

providing a tire;

at least partially filling the tire with a composition which is a fluid comprising a carrier fluid and at least one fibrous material, wherein the carrier fluid comprises a fluid derived from at least one of sorghum, cane, sugar beet, corn, soybean, and lumber, and wherein the composition remains fluid in use and is non-corrosive;

puncturing the tire during use; and allowing the composition to flow to the puncture, wherein the composition fills and seals the puncture;

wherein the step of at least partially filling the tire with the composition is accomplished by providing the composition. in a bag that is placed on the air chamber of the tire and bursts during rotation of the tire in use and releases the composition onto the innerliner of the tire.

13. The method of claim 12 wherein the at least one fibrous material is selected from the group consisting of cellulose, wool, flax, nylon, rayon, wollanstonite, rockwool, cotton, glass, polyester, Kevlar, and polypropylene.

14. The method of claim 12 wherein the at least one fibrous material is fire-retardant.

* * * * *